United States Patent Office.

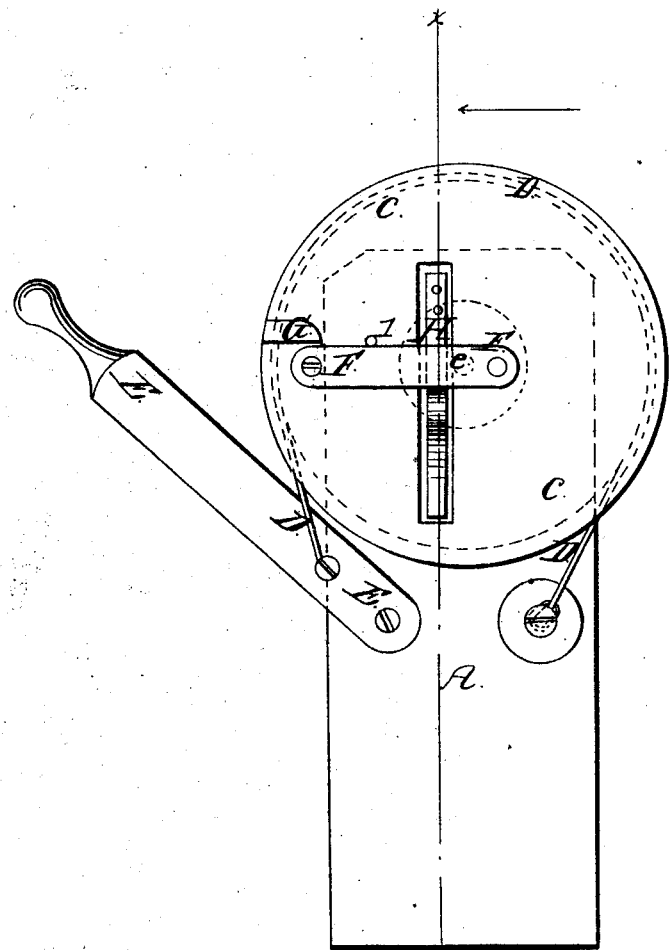
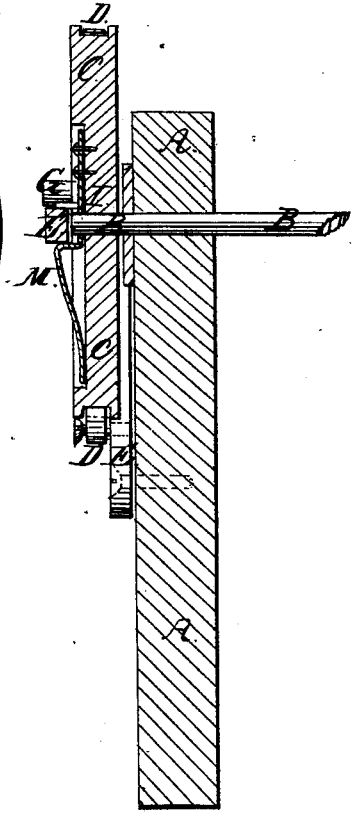

R. M. VAN SICKLER, OF NEW YORK, N. Y.

Letters Patent No. 69,727, dated October 8, 1867.

---

IMPROVEMENT IN COMBINED CRANK, FRICTION-WHEEL, AND BRAKE.

---

*The Schedule referred to in these Letters Patent and making part of the same.*

---

TO ALL WHOM IT MAY CONCERN:

Be it known that I, R. M. VAN SICKLER, of the city, county, and State of New York, have invented a new and useful Improvement in Combined Crank, Friction-Wheel, and Brake; and I do hereby declare that the following is a full, clear, and exact description thereof, which will enable others skilled in the art to make and use the same, reference being had to the accompanying drawings, forming part of this specification, in which—

Figure 1 is a side view of my improved machine.

Figure 2 is a vertical longitudinal section of the same, taken through the line $x\ x$, fig. 1.

Similar letters of reference indicate corresponding parts.

My invention has for its especial object to improve the construction of my improved portable elevator, patented February 12, 1867, but it is equally applicable wherever a crank and brake are used; and it consists in the manner in which the crank is combined with the wheel, and in the combination of the crank, friction-wheel, brake-strap, brake-lever, and pinion-shaft, with each other, as hereinafter more fully described.

A represents a part of the frame of an elevator or other machine. B is the pinion-shaft, by means of which the power is applied to the machine. To the end of the shaft B is securely attached the friction-wheel C, the face of which is grooved in the usual manner, for the reception of the brake or friction-strap D. One end of the strap D is secured to the frame A, or to some other suitable support, and its other end is attached to the lever E. One end of the lever E is pivoted to the frame A, or to some other suitable support, and the other end extends out into such a position as to be easily reached and operated. F is the crank, the end of which is pivoted to the side of the wheel C, near its outer edge, so as to give as much leverage as possible for the application of the power. G is a flange or rest, securely attached to or formed solidly upon the side of the wheel C, said flange being so placed that the crank F may rest against it, and be supported while operating the machine. When it is desired to reverse the motion or let the machine run back, the crank F is turned back upon its pivot, so as to bring its handle to or nearly to the centre of the wheel C, as shown in fig. 1. This enables the machine to be run back without throwing it out of gear, and without danger of injuring any one by an accidental blow from the crank. The crank F may be held in place at the centre, when turned back, by a spring-catch, H, or by some equivalent device. The crank F may be kept from moving too far when turned back by a stop-pin, I, or some equivalent support, or the flange G may be so formed as to stop the crank when turned back to the proper point. The latter construction I prefer. By attaching the crank to the brake-wheel C, and arranging it in the manner herein described, I am enabled to make the machine much more compact than is possible when the crank is attached to the opposite end of the shaft from the friction-wheel, and when a device is necessary for throwing the machine out of gear every time it is necessary to let the machine run back. If desired, the crank F, instead of being pivoted to the wheel C, may be set in a groove, so that when it is desired to reverse the motion, or let the machine run back, the crank may be pushed back in the groove, so as to bring the handle of said crank to or nearly to the centre of the wheel.

Having thus described my invention, what I claim as new, and desire to secure by Letters Patent, is—

1. Attaching the crank to the wheel, in such a way that it may be turned or moved back so as to bring its handle to or nearly to the centre of said wheel, substantially as herein shown and described, and for the purpose set forth.

2. The combination of the crank F, friction-wheel C, brake-strap D, and brake-lever E, with each other, and with the pinion-shaft B, substantially as herein shown and described, and for the purpose set forth.

The above specification of my invention signed by me this 30th day of July, 1867.

R. M. VAN SICKLER.

Witnesses:
ALEX. F. ROBERTS
JAMES T. GRAHAM.